United States Patent [19]

Trowbridge

[11] Patent Number: 5,490,582
[45] Date of Patent: Feb. 13, 1996

[54] LOCKING CHOCK FOR TANDEM WHEELED VEHICLES

[76] Inventor: Gerald D. Trowbridge, 34485 Highway 93, St. Ignatius, Mont. 59865

[21] Appl. No.: 376,221

[22] Filed: Jan. 23, 1995

[51] Int. Cl.⁶ .................................................. B60T 1/04
[52] U.S. Cl. .............................. 188/2 R; 188/32; 188/74
[58] Field of Search ............................... 188/2 R, 4 R, 188/32, 74; 254/108, 111, 133 R; 74/475, 479 ML, 519, 533, 540

[56] References Cited

U.S. PATENT DOCUMENTS

| | | | |
|---|---|---|---|
| 433,413 | 7/1890 | Lawrence | 188/2 R |
| 3,059,728 | 10/1962 | McKuskie | 188/2 R |
| 3,124,013 | 3/1964 | Ulm | 254/108 |
| 3,548,975 | 12/1970 | Herndon | 188/74 |
| 3,737,147 | 6/1973 | Morgan et al. | 254/108 |
| 3,760,906 | 9/1973 | McGee | 188/4 R |
| 4,934,489 | 6/1990 | Jackson | 188/2 R |
| 5,368,134 | 11/1994 | Rickman et al. | 188/2 R |

*Primary Examiner*—Douglas C. Butler
*Assistant Examiner*—Chris Schwartz
*Attorney, Agent, or Firm*—Keith S. Bergman

[57] ABSTRACT

A locking wheel chock, for positioning between adjacent tandem wheels on spaced axles of a vehicle having no independent braking system provides upper and lower pairs of wheel contacting blocks connected in spaced relationship by a telescoping body assembly. The telescoping body assembly carries a rack on one portion and a fastening lever with a partial pinion on the other portion to engage the rack to adjust the length of the body assembly to move the wheel blocks into and out of fastening engagement with the tandem wheels for preventing relative rotation. Each wheel block is independently pivoted to allow tangential contact with the adjacent tire tread. A lock prevents movement of the fastening lever to maintain positioning and prevent tampering with the wheel chock when the fastening lever is in fastening position. A first species of wheel block provides paired adjustably spaced blocks on each side of the center line of tandem wheels. A second species of wheel block provides a unitary, pivotally mounted wedge-shaped block with curvilinear wedge surfaces for wheel contact.

8 Claims, 3 Drawing Sheets

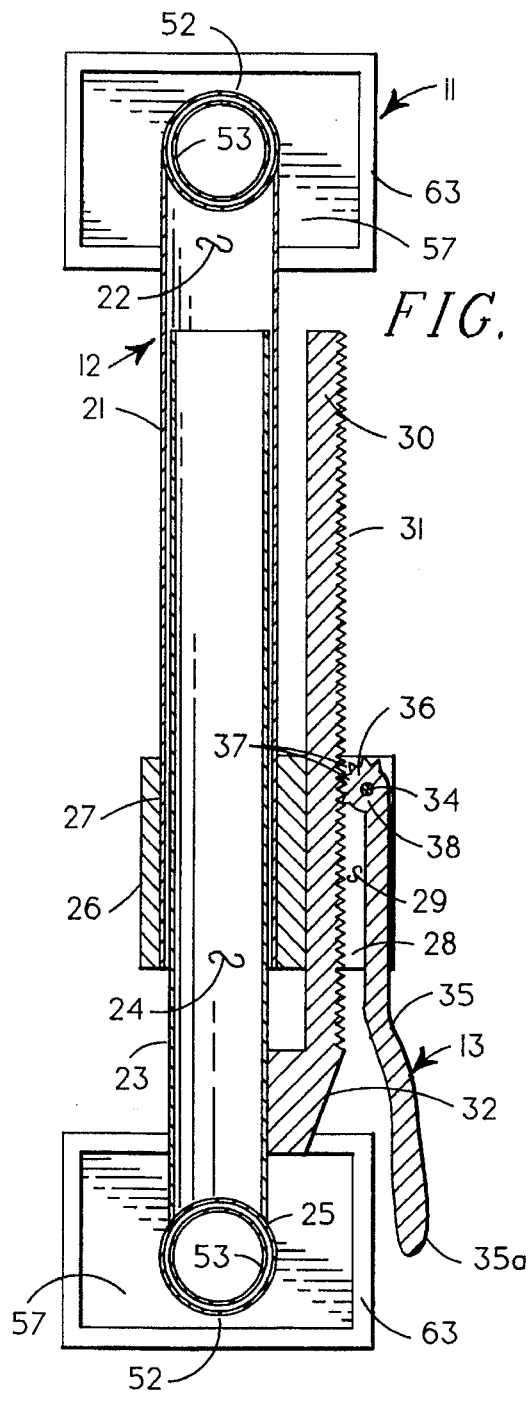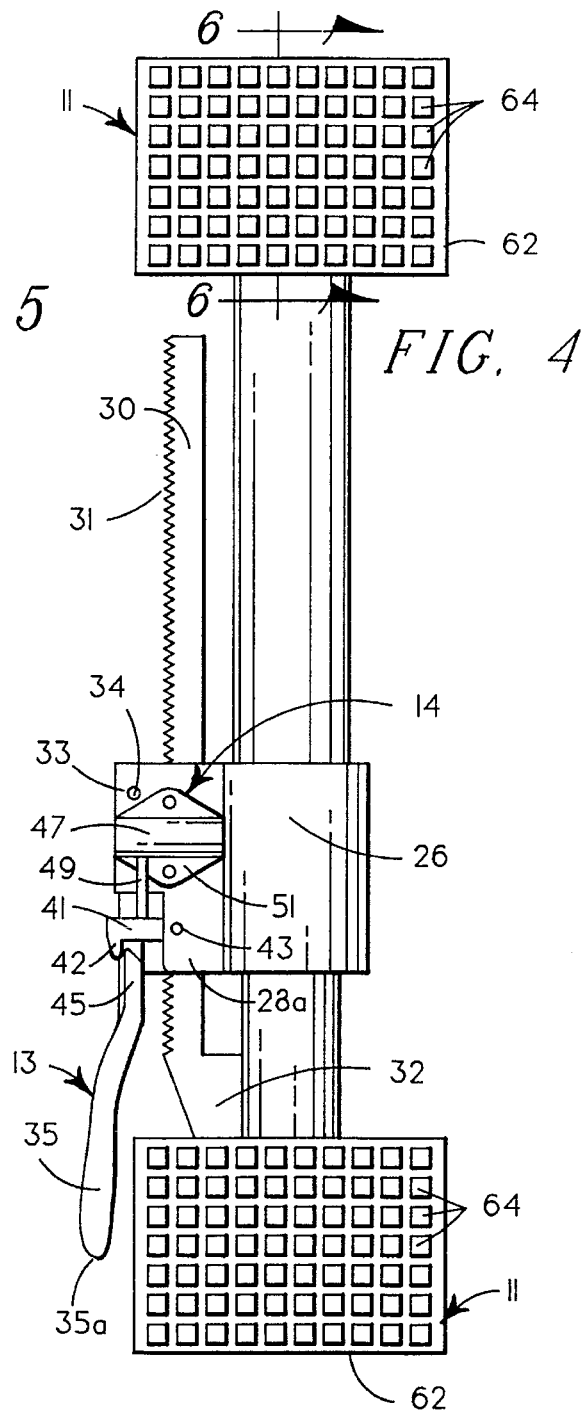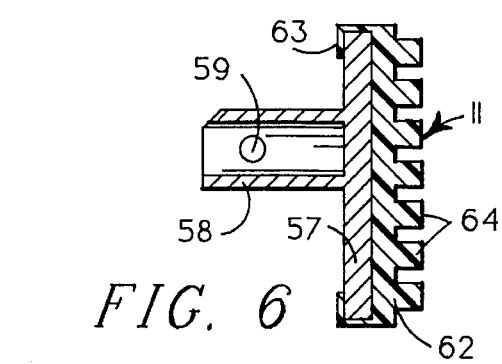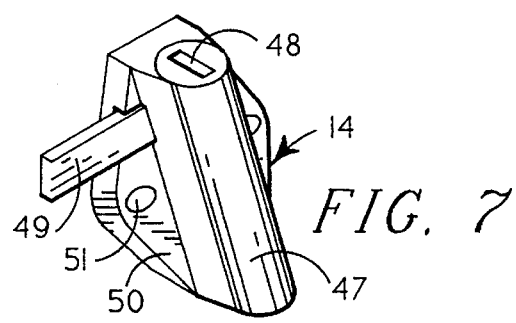

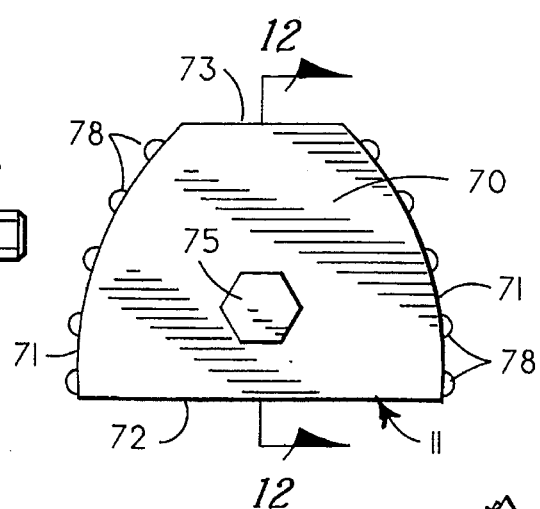
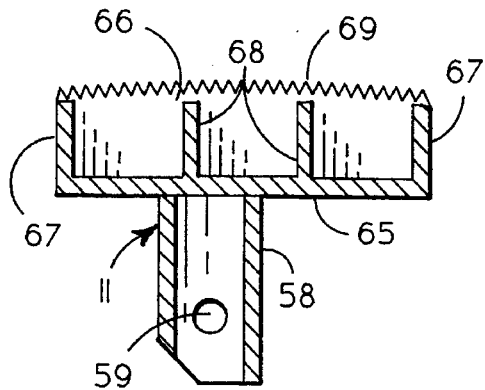
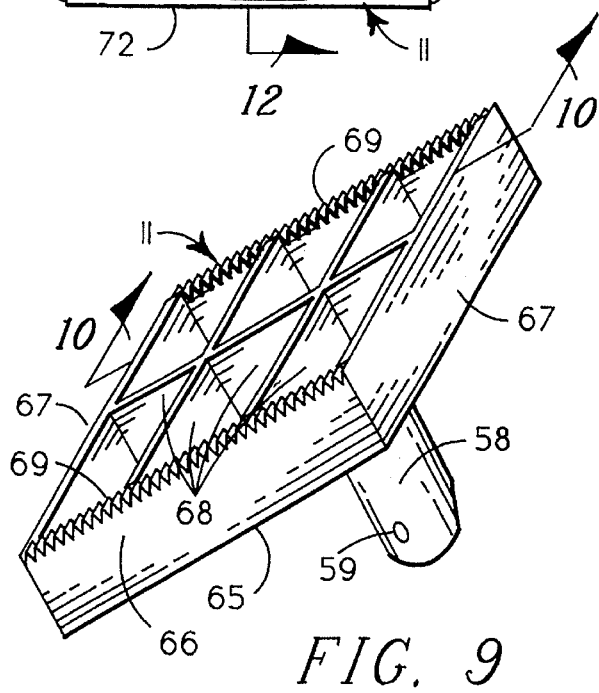
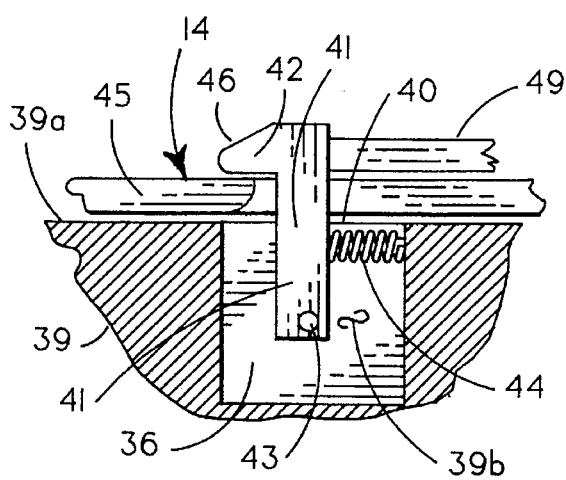
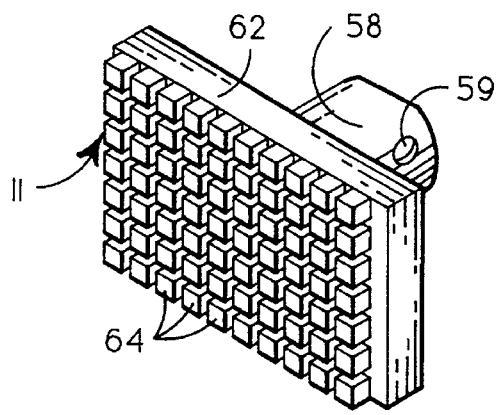

LOCKING CHOCK FOR TANDEM WHEELED VEHICLES

BACKGROUND OF INVENTION

RELATED APPLICATIONS

There are no applications related hereto heretofore filed in this or any foreign country.

FIELD OF INVENTION

My invention relates to adjustable wheel chocks having opposed wheel blocks carried between tandem wheels of vehicles to prevent relative tandem wheel rotation for positional maintenance of the vehicle.

BACKGROUND AND DESCRIPTION OF PRIOR ART

It is often desirable to immobilize a vehicle having tandem wheels, especially in the case of a vehicle not having an internal braking system. It may be desired to immobilize the wheels for positional maintenance of the vehicle on a supporting surface, such as in the case of trailers that are to be maintained on a sloping surface. It may also be desirable to immobilize such vehicles to prevent theft or other unauthorized use. The problem has long been recognized and various mechanical devices have become known to resolve it.

Undoubtedly the most commonly used device for positional maintenance of wheels on a supporting surface is the traditional wedge-shaped wheel chock which is positioned immediately adjacent one or both sides of a vehicle wheel while supported on the surface supporting the wheel. This type of wheel chock is usable with either single or tandem wheels. Lineally adjacent tandem wheels, however, by reason of their structure offer a configuration that allows the use of chocks that fit between the wheels to prevent relative rotation and such chocks need not necessarily be associated with the surface supporting the wheels. The instant invention provides a new and improved set of locking wheel chocks of this latter nature.

Prior wheel chocks that have been designed for use with lineally adjacent tandem wheels have provided at least one element that extends between the tandem wheels and is positionally maintained with sufficient frictional force to prevent their relative motion. Most such chocks have provided two similar members that are adjustably interconnected and fit between adjacent tandem wheels with one member above and the other member below a line between the wheel centers. Such two member chocks have become popular because they tend to provide greater security in positional maintenance of tandem wheels and tend to provide the same positional maintenance of the wheels no matter which way a potential rotational force is applied to them. The two-member type of tandem wheel chock is readily distinguished from the single chock, whether the single chock is positioned between the tandem wheels or on one or both sides of the wheels, with support on the ground beneath the wheels or from the vehicle.

For an opposed two block tandem wheel chock to be effective, the wheel blocks must engage the adjacent wheel treads with sufficient frictional force that the contacting surfaces are relatively immovable. Some prior devices have used wedge-shaped elements of a unitary nature to fastenably engage the opposed surfaces of adjacent tandem wheels, but such frictional engagement has not been completely effective to accommodate various vehicles having tandem wheels of different sizes and different spacing. Generally, the greatest friction between a wheel block and adjacent wheel is attained if the wheel contacting surface exerts force on the wheel in a direction substantially normal to the area of tangency of the wheel block surface on the wheel's circular periphery. The instant invention in its first species accomplishes this end by providing opposed pivotally mounted flat wheel blocks on both the upper and lower block members of the wheel chock, in distinguishment from prior devices that have not pivotally mounted the wheel block elements at a pivot point spaced from the middle of the wheel chock so that the force on a wheel is applied by the blocks in a normal direction at the point of tangency of the wheel block on the adjacent wheel.

For a wheel block to provide appropriate frictional contact with the surface of an adjacent wheel, the block itself must have a friction generating surface. The wheel blocks of the instant chock provide such a surface by using a plurality of protuberances arrayed in friction maximizing configuration. In one sub-species the protuberances are formed of resiliently deformable material and in others they are formed with sufficient relief to create appropriate frictional force, but yet not harm the structure of a tire tread or other wheel surface that they engage. Prior wheel chocks have often provided smooth or relatively smooth tire contacting surfaces and have depended largely upon substantial force on a tire surface to cause deformation and a consequent larger contact area to create sufficient frictional force to allow the device to accomplish its purpose. My wheel blocks may be applied with such force as creates tire deformation as in prior devices, but this is not necessary and when a higher deforming force is used, my blocks still create more friction than prior devices under the same force because of the nature of their tire contacting surfaces and the directional orientation of the applied force.

For a tandem wheel fastening chock with vertically opposed blocks to be effective, it must have mechanism to move the blocks toward each other with appropriate fastening force, but yet to have practical convenience the chock must be simply and easily operable. In general, the amount of force involved to cause appropriate frictional engagement of wheel block elements on an adjacent tire requires some type of advantaged mechanical linkage and to provide adjustment, the mechanical linkage has had to allow block motion through substantial distance. This in the prior chocks commonly has been accomplished by a screw or a compound lever. Screw devices, however, are time consuming and difficult of operation and compound levers have been mechanically complex and required excessive force for operation. The instant chock resolves this problem by providing a telescoping linkage between the opposed wheel block members that is moved by a ratchet carried on one telescopic element and a pinion defined at one end of a lever arm with the pinion teeth defined about only a portion of the pinion periphery to give the advantages of both a rack and pinion linkage and an over-center lever, which may be easily positionally maintained to aid the locking function of the chock. The adjustability of my chock is accommodated by adjustment of the relatively movable body portions rather than by the locking mechanism so that no great amount of motion of the locking mechanism is required.

A tandem wheel chock to be commercially viable must be adaptable to accommodate a substantial number of varying tandem wheel configurations. The tandem wheels themselves vary in diameter from some few inches in the case of light utility type trailers intended to be propelled by automobiles to several feet in over-the-road freight transport trailers. The spacing between the peripheries of adjacent tandem wheels also varies substantially from an inch or two to a foot or more. Prior tandem wheel chocks have not well addressed, this problem and have either been usable only with a particular predetermined tandem wheel configurations or have allowed only limited adjustment accomplished by moving the vertically opposed wheel blocks toward or away from each other. The instant chock in its first species resolves this problem by mounting the opposed block elements of a pair on adjustably extensible arms so that the two elements of a pair may be variably spaced relative to each other in a horizontal plane. Pivotal mounting of each block element on this support still maintains contact of each element in a tangential orientation with an adjacent tire tread as previously described, without reference to the amount of extension of the horizontal arms carrying the elements. Additionally in all species the body connecting the wheel blocks is adjustable as to length by releasing the fastening lever pinion from its associated rack and manually moving the body elements to appropriate position, without engaging the rack and pinion in fastening mode or interfering with their operation.

If a tandem wheel chock is to be used as a security device, it must be fastenable in some manner that prevents its release by an unauthorized person. Commonly in prior devices, such fastening has been accomplished, if at all, by some type of padlock device that generally fastens a lever in a fastening position. Padlock devices have not been completely satisfactory to fulfill this purpose, however, as a padlock may be easily and simply removable by an unauthorized third person by cutting the shackle with readily available devices such as a saw, welding torch, bolt cutter or the like. The instant chock in contradistinction provides a structurally carried tumbler lock having an extensible bolt that contacts the fastening lever of the ratchet mechanism to prevent the pinion fastening lever from moving from the fastened position to make any unauthorized forcible release difficult and less probable than with a padlock.

The instant invention resides not in any one of these features individually, but rather in the synergistic combination of all of the structures of my wheel chock that necessarily give rise to the functions flowing therefrom as herein specified and claimed.

SUMMARY OF INVENTION

My invention provides an adjustable locking wheel chock for adjacent tandem wheels carried by spaced axles of a vehicle. The chock provides wheel blocks separated by an interconnecting telescopically Movable body. One telescoping body member supports an elongate axially aligned rack and the other body member supports a bracket pivotally carrying a fastening lever defining a partial pinion at an inner end to engage the rack to cause rack motion responsive to pivotal motion of the lever to move the wheel blocks from or into frictional engagement with the tandem.

The tire contacting faces of each wheel block define a surface that creates substantial friction when engaged with an adjacent wheel periphery to prevent relative tire motion and chock removal when fastened between tandem wheels for use. Each wheel block is independently pivoted to maintain the block element face tangential to an adjacent tire tread at a medial point within the contact area. A key operated lock provides a bolt that extends to contact the fastening lever to prevent movement of that lever when in fastening mode. In providing such a device, it is:

A primary object to provide an improved locking wheel chock that has a compound adjustable body interconnecting opposed wheel blocks for releasable fastening between aligned tandem wheels carried on spaced axles.

Another object is to provide such a wheel chock that provides the mechanical advantages of both lever and rack and pinion mechanisms to create force between spaced wheel blocks to releasably fasten between tandem wheels to prevent relative motion.

Another object is to provide such a chock with spaced wheel blocks that pivot to engage an adjacent wheel peripheral surface in a tangential orientation at the point of force application to maximize frictional force between the block and wheels.

Another object is to provide such a chock that in one species has opposed pairs of wheel block elements that are positionable at different distances from each other provide adjustability for use of the chock on a wide variety of tandem wheels and wheel configurations.

Yet another object is to provide individual wheel block elements with an improved wheel contacting surface that increases the friction between the block and wheel, but yet cause no damage to a pneumatic tire carried by a wheel.

Still another object is to provide such a chock that has a bolt type lock that is carried in the fastening structure to secure the wheel chock against unauthorized users by preventing release of the fastening arm when locked in fastening position.

Other and further objects of my invention will appear from the accompanying drawings and the following specification. In carrying out the objects of my invention, however, it is to be understood that its accidental features are susceptible of change in design and structural arrangement with only preferred and practical embodiments of the best known mode being illustrated in the accompanying drawings as required.

BRIEF DESCRIPTION OF THE DRAWINGS

In the accompanying drawings which form a part hereof and in which the same numbers refer to the same parts in all views:

FIG. 4 is an orthographic front view, taken from the left side of the wheel chock of FIG. 2, with the fastening lever in fastening position FIG. 5 is a vertical cross-section of the wheel chock of FIG. 2, taken on the line 5—5 on that Figure in the direction indicated by the arrows.

FIG. 6 is an enlarged vertical sectional view through the wheel block of FIG. 4, taken on the line 6—6 thereon in the direction indicated by the arrows.

FIG. 7 is an isometric view of the lock assembly seen in FIG. 4.

FIG. 8 is an isometric view of the first species of wheel block element shown in FIG. 4.

FIG. 9 is an isometric view of a second species of wheel block element having serrated side edges to frictionally engage a tire tread.

FIG. 10 is a partially cross-sectional view of the wheel block element of FIG. 9, taken on the line 10—10 thereon on that Figure in the direction indicated by the arrows thereon.

FIG. 11 is an orthographic end view of a third species of unitary wedge-shaped wheel block having arcuately configured sides.

FIG. 12 is an expanded medial vertical cross-sectional view through the wheel block of FIG. 11, taken on the line 12—12 in the direction indicated by the arrows thereon.

FIG. 13 is an enlarged partial cut-away view of the fastening mechanism showing its catch structure in detail.

DESCRIPTION OF THE PREFERRED EMBODIMENT

My tandem wheel chock comprises similar upper and lower wheel blocks 11 interconnected by telescopically articulating body 12 which carries fastening mechanism 13 that is maintainable in fastening position by lock 14.

Figure 1:
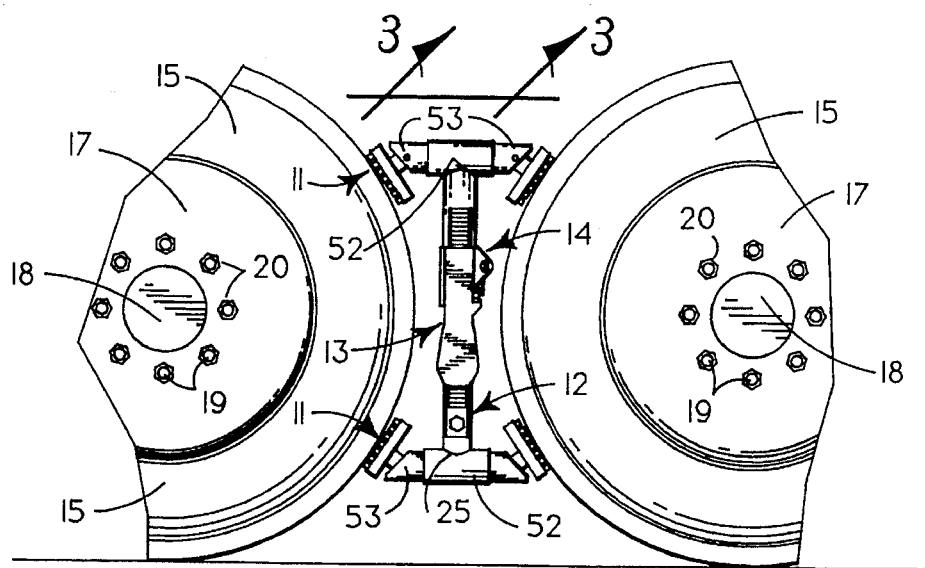
FIG. 1 is an orthographic side view of my wheel chock mounted between two lineally spaced tandem wheels of a vehicle.
Figure 2:
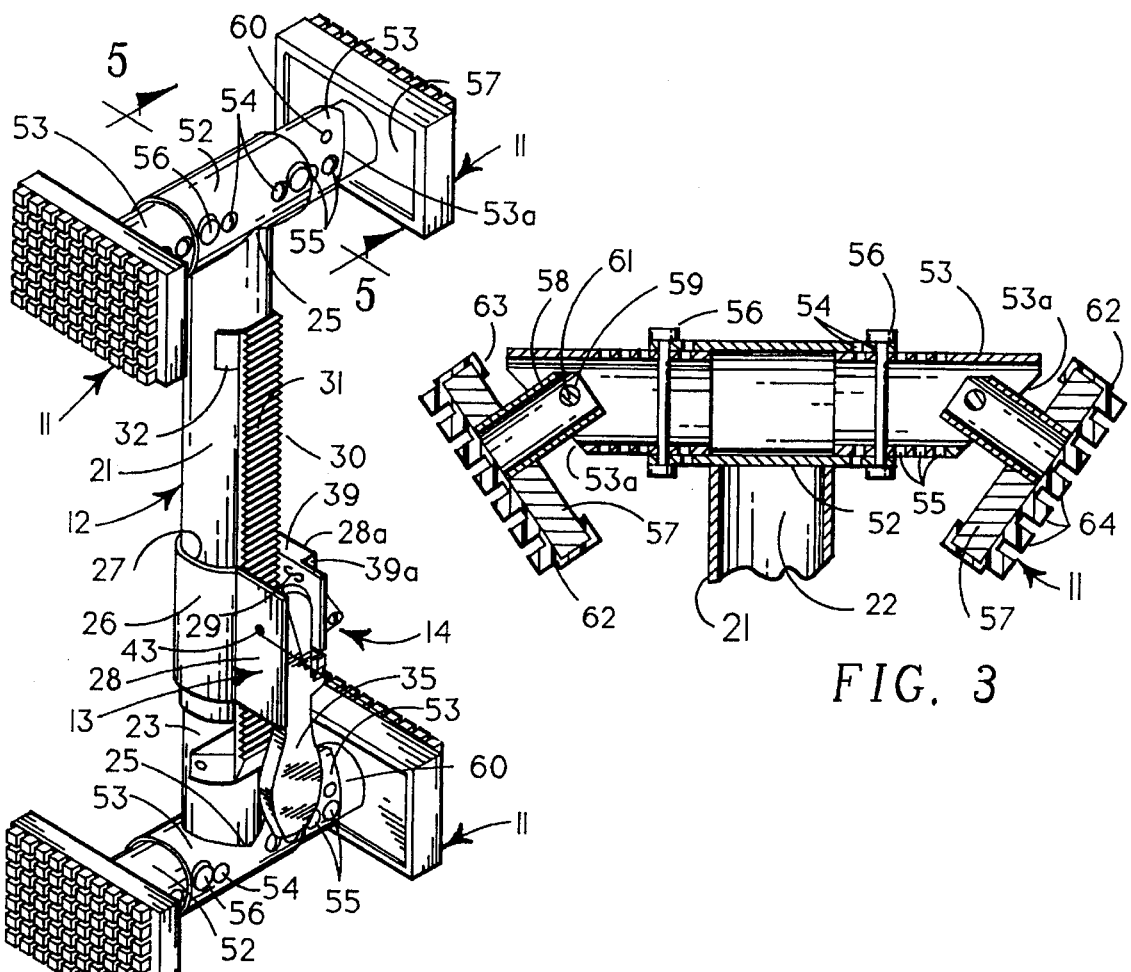
FIG. 2 is an enlarged isometric view of the chock of FIG. 1 showing its parts, their configuration and relationship in more detail.
Figure 3:
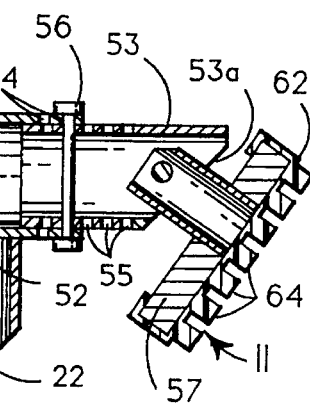
FIG. 3 is an enlarged cross-sectional view through the upper wheel block structure of FIG. 1, taken on the line 3—3 thereon in the direction indicated by the arrows.

As seen in FIG. 1, lineally aligned tandem wheels 15 rest on underlying supporting surface 16. The tandem wheels each have hubs 17 that are carried on vehicle axles 18 by lugs 19 structurally carried by the axle and extending through the wheel which is fastened thereon by lug nuts 20 in traditional fashion. My wheel chock is shown in fastening position between tandem wheels 15.

Body 12, as seen particularly in FIG. 5, provides outer body tube 21 defining internal channel 22 that is incrementally larger than inner body tube 23 which defines internal channel 24, so that the inner body tube may be slidably carried in channel 22 of the outer body tube. The outer end portions of both body tubes 21, 23 is formed with an appropriate transition configuration 25 to conformably interfit with the perpendicular tubular body of opposed wheel blocks which are interconnected by the body assembly.

Fastening mechanism 13 provides a fastening bracket having body 26 defining cylindrical channel 27 to fit about the inner end portion of outer body tube 21, with similar opposed legs 28 extending away from the body 26 to define channel 29 therebetween. Elongate relatively thin rack 30 defining teeth 31 on its side distal from the body 12 is carried by upper fastening dog 32 which in turn is structurally supported on the outer portion of inner body tube 23 in a position that maintains the rack within channel 29 defined by the fastening bracket. The fastening dog 32 carries rack 30 spacedly distant from the adjacent surface of inner body tube 23 and parallel thereto so that the inner surface of the rack is immediately adjacent and slidably supported on body 26.

The lower portion of legs 28 define opposed cooperating lever pin holes 33 to carry lever pin 34 extending therebetween to pivotally mount fastening lever 35. The fastening lever 35 is an elongate element defining outer handle portion 35*a*, angulated somewhat away from rack 30 to aid grasping without interference from the rack. The inner portion of the fastening lever defines partial pinion 36 having only a few teeth 37 defined about its periphery to operably engage the teeth 31 of rack 30. The pinion defines axle hole 38 for pivotal mounting on lever pin 34. The teeth 37 are configured and arrayed to engage the rack through an angle of rotation of fastening lever 35 of approximately sixty to ninety degrees and otherwise the pinion peripheral surface allows free motion of the rack relative thereto when the toothed portion is not engaged with the rack. This mechanism allows manual adjustment of the axial positioning of the body tubes 21, 23 relative to each other, but provides an over-center lever fastening means for positive motion of the tubes when the pinion teeth 37 contact the rack teeth 31.

One leg 28*a* of the fastening bracket is thicker in its end portion proximate the inner body tube to define fastening protuberance 39 with outwardly facing fastening surface 39*a* and internal chamber 39*b*. The chamber 39*b* extends inwardly from fastening dog orifice 40 defined in surface 39*a* to allow passage of L-shaped fastening dog 41 defining fastening hook 42 in its outer end to extend spacedly above surface 39*a* of the fastening structure with the fastening hook extending toward the inner body tube 23. The fastening dog 41 is pivotally mounted by pin 43 carried by the fastening protuberance 39 and is biased in the direction of the fastening hook extension by compression spring 44 carried in chamber 39*b*. The medial portion of fastening lever 35, adjacent handle structure 35*a*, defines laterally extending fastening catch 45 that extends under fastening hook 42 and adjacent to fastening surface 39*a* of the fastening structure when the fastening lever is in fastening position.

With this structure, fastening dog 41 may be manually moved to release fastening catch 45 of the fastening lever and allow motion of that lever to open the chock. When the fastening lever is moved to a fastening position, the fastening catch 45 will move along the upper angulated surface 46 of the fastening hook 42 to move the fastening dog 41 against its spring bias to allow the fastening catch to move into immediate adjacency with fastening surface 39*a* of the fastening structure. When this position is attained, the fastening dog will no longer be prevented from moving against its bias and hook 42 will move over the fastening catch 45, as illustrated in FIG. 13, to positionally maintain the fastening lever and thusly the fastened mode of the chock.

Lock mechanisms 14 are carried by the fastening bracket 26. As seen in FIGS. 4 and 7, the lock mechanism provides tumbler lock 47 operated by a key (not shown) insertable in key slot 48. The tumbler lock provides perpendicularly extending lock bar 49 that is movable inward and outwardly from the lock tumbler responsive to lock operation by an appropriate key. The entire lock structure is carried by base 50 having fastening means 51, in the instance illustrated rivets.

Lock base 50 is structurally carried by fastening means 51 on the rearward surface of leg 28*a* of the fastening bracket in such position that lock bar 49 is extendable toward fastening dog 41 to maintain that dog in its fastened position, but is movable to a retracted position to allow motion of the fastening dog to release the fastening lever. When the lock bar 49 is extended to prevent motion of fastening dog 41, that dog will positionally maintain fastening lever 35 in a fastening position and will not allow it to move from that position until the fastening dog is released by the lock bar and manually moved.

Wheel blocks 11 are carried at each end of body assembly 12. Transition portions 25 at the outer end portions of both outer body tube 21 and inner body tube 23 structurally interconnect similar, perpendicularly extending tubular wheel block supports 52, each defining an internal channel to slidably receive similar opposed wheel block support arms 53. The wheel block support arms 53 are tubular elements having truncated outer end portions 53a to allow appropriate pivotal motion of wheel block elements carried thereby, The fastening tube supports define spaced holes 54 and the support arms define similar spaced holes 55 so arrayed that both sets of holes 54, 55 may be aligned in cooperating pairs to receive fastening pins 56 therebetween to provide selectively variable lateral extension for each block support arm 53, The first species of wheel, block illustrated in FIGS. 1–6 and 8 provides rectilinear body 57 structurally supporting tubular connecting arm 58, The tubular connecting arm 58 preferably communicates with the body in an asymmetrical position as illustrated to create fastening force in the outer portion of the wheel block to cause a better and higher frictional interconnection with an adjacent wheel, The inner end portion of each tubular connecting arm 58 defines hole 59 which cooperates with hole 60 defined in the outer portion of the tubular connecting arm to receive double-headed fastening pin 61 to interconnect the wheel block elements and wheel block arms in pivotal fashion, Body 57 of the first species of wheel block element carries friction pad 62 defining inwardly extending lip 63 to fit about the sides and a peripheral portion of the back of body 57 for positional maintenance, The outer face of friction pad 62 defines a plurality of spaced protuberances 64 to increase frictional contact with the circumferential face or tread of a tire carried by a wheel to be immobilized by my chock, This species of pad is formed from a resiliently deformable material such as rubber or an elastomeric polymer to allow placement on body 57 and to increase and provide appropriate frictional contact with an adjacent tire. If material from which the frictional pad is formed does not allow placement by use of lip 63, it is in the ambit and scope of my invention to fasten the frictional pad to the body by other known means such as adhesion, riveting bolting or the like A second species of wheel block element is illustrated in FIGS. 9 and 10 where it is seen to provide rectilinear back plate 65 carrying structurally joined peripheral side elements 66 and end elements 67. The medial portion of this back plate carries a network of cross supports 68, and the outer edges of both side elements define a series of teeth 69. Preferably the outwardly projecting edges of the side elements 66 are of somewhat arcuately convex configuration with their medial portions being more distal from back 65 than the ends and preferably the outer surfaces of the ends, network elements and end portions of sides are substantially coplanar to provide a high frictional contact with an adjacent tire tread. This species of wheel block structurally provides a connecting arm 58 of the same nature as the first species.

A third species of wheel block element that has no fastening tube supports or support arms, but rather provides a unitary, peripherally defined structure pivotally carried directly by the end portions of body tubes 21, 23 is shown in FIGS. 11 and 12. This wheel block element provides a body peripherally defined by similar planar sides 70 structurally joining arcuate ends 71 at the adjacent edges of these structures. The structure is so formed that the outer edges 72 of the sides are longer than inner edges 73 to provide the truncated curvilinear wedge shape illustrated. The two sides 70 are spaced apart a distance sufficient to provide end surfaces with desired area. The wedge base and truncated apex carry structurally joined base plate 79 and apex plate 80 respectively. The interior chamber of the fastening block carries a network of cross supports 77 that provide strength and rigidity. The outer surface of arcuate ends 71 carry a plurality of spaced protuberances 78 to provide greater frictional contact with an adjacent tire tread. A medial outer portion of each side defines paired opposed cooperating fastener holes 74. Nut-bolt combination 75 extends through fastener holes 74 and through body tube holes 76 to pivotally interconnect the wheel block to the outer ends of both outer body tube 21 and inner body tube 23, as illustrated.

The various elements of my wheel chock are formed of some rigid durable material of appropriate strength to allow the function of the device, preferably a metal such as mild steel, except for the frictional pad of the first species of wheel block element which is formed of a resiliently deformable material such as rubber or elastomeric plastic. It is possible that the rigid elements may be formed of some of the harder, more dense polymeric or resinous plastics and those materials are within the scope and ambit of my invention. If the device is formed of metal, preferably the various elements that are structurally joined are joined by welding, if not otherwise specified. In the case of plastics, the various elements are joined by known methods such as adhesion or the thermal welding. The absolute dimensioning of my wheel chock is not critical and is adapted to fulfill particular needs. The relative configuration of elements, however, is required as specified for functionality.

Having described the structure of my wheel chock, its operation may be understood.

A wheel chock, of a size compatible with the configuration of tandem wheels to be locked, is constructed and assembled according to the foregoing specification. The fastening lever 35 is released and pivoted upwardly to allow the inner and outer body tubes to be manually moved relative to each other, and those tubes are so moved until the wheel block elements are in appropriate position so that each individual wheel block element will contract an adjacent tire tread in an angulated fashion as illustrated. The chock is manually positioned between the tandem wheels as seen FIG. 1, with the upper wheel block resting on the tread of each tandem tire above their centers, and the lower wheel block pair resting on the tires below their centers. The wheel block arms 53 are adjusted forwardly and rearwardly with reference to the vehicle as necessary.

The fastening lever 35 is then moved pivotally downwardly so that the teeth of partial pinion 36 operatively engage the teeth 31 of rack 30 and the downwardly motion is continued. The rack and pinion mechanism will continue to move the two body members, and consequently the wheel blocks, toward each other so that those wheel blocks engage the tandem wheels with some force, the amount of which may be adjusted within limits by the design of the rack and pinion teeth. As the downward motion of fastening lever 35 continues, the fastening catch 45 of the fastening lever will engage the sloping surface 46 of fastening dog hook 42 and move the fastening dog 41 against its spring bias and away from the fastening catch 45. This motion will continue until the fastening catch is immediately adjacent fastening surface 39a when fastening hook 42 will pass over the surface of the fastening catch by reason of the spring bias of the fastening dog. The fastening mechanism will then be maintained in this fastened position until manually changed.

If it be desired to lock the fastening lever in its fastened position, tumbler lock 47 is operated by an appropriate key (not shown) to cause lock bar 49 to extend to engage fastening dog 41 to prevent its motion away from fastening catch 45 and thusly maintain the locked position of fastening lever 35. The lock key is then removed and the fastening mechanism is secured.

In locked condition, the chock device will be secured between a set of tandem wheels. The device cannot be removed by lengthening the inner and outer body tubes relative to each other because they are locked in a predetermined position by the fastening mechanism. The wheel blocks may not be moved laterally in the direction of the axes of the tandem wheels by reason of their frictional engagement with the associated wheels. In this fastened position then, the wheel chock prevents relative motion of the tandem wheels to positionally maintain a vehicle and unauthorized removal of the chock can be accomplished only by physical destruction.

The operation of the chock with the second and third species of wheel locks is substantially the same as the operation with the first species of block. In the case of the third species, there is no forward and rearward adjustment of the wheel blocks since the wheel block structure is unitary, but the adjustment and fastening of the chock by moving inner and outer body tubes is the same as described with the first species.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A locking wheel chock to prevent the relative rotation of adjacent tandem wheels carried in alignment on spaced axles of a vehicle, comprising in combination:

a body having an inner body tube slidably carried by an outer body tube for extensible motion relative thereto, with each outer end of each body tube having means to support at least one wheel block;

fastening mechanism carried by the body assembly to adjustably fasten the inner and outer body tubes relative to each other, including, a rack, supported on the inner body tube, extending a spaced distance over the outer body tube, defining teeth on the surface distal from the inner body tube, a fastening bracket carried by the outer body tube, said fastening bracket having a body with similar spaced legs extending therefrom to define a channel therebetween to slidably receive the rack;

a fastening lever supported by the fastening bracket for pivotal motion of a first end portion in the channel defined by the fastening bracket legs, said lever having a medial fastening catch and defining at the first inner end a sector of a pinion having teeth to operatively engage the teeth of the rack to move the inner body tube relative to the outer body tube responsive to pivotal motion of the fastening lever, and a fastening dog pivotally carried by the fastening bracket to fastenably engage the fastening catch of the fastening lever, said fastening dog being biased to fastenably engage the fastening catch but being manually movable to release the fastening catch; and at least one wheel block pivotally supported by each of the outer ends of the inner and outer body tubes to contact portions of two aligned tandem wheels above and below a line through the wheel centers to prevent relative rotation thereof.

2. The wheel chock of claim 1 further characterized by:

a lock supported by the fastening bracket, with a lock bar extendable to contact the fastening dog when fastening the fastening lever, to prevent release of the fastening dog when in lock mode.

3. The wheel chock of claim 1 further characterized by:

the means to support wheel blocks comprise tubular wheel block supports structurally carried in their medial portions by each body tube to extend in parallel array perpendicularly to each body tube, each said wheel block support carrying similar wheel block arms adjustably extending therefrom and each wheel block arm pivotally carrying a wheel block having a body supporting on its inner side a connecting arm, positioned asymmetrically on a medial line of the body in the plane of the axes of the body tubes and wheel block supports, and having means for pivotal interconnection with a wheel block arm.

4. The wheel chock of claim 3 further characterized by:

each wheel block having a rigid body and an outer surface comprising a plurality of spaced protuberances formed of resiliently deformable material.

5. The wheel chock of claim 3 further characterized by:

each wheel block comprising a peripherally defined elongate body having an internal support network defining an outer body surface with two opposed wheel contacting sides of arcuate configuration extending from the outer body surface and defining tooth-like serrations to increase frictional contact with an adjacent tire tread.

6. The wheel chock of claim 1 wherein the means to support wheel blocks comprise:

the outer end portion of each body tube defining a hole pivotally mounting a unitary wheel block, each said wheel block being coplanar with the other and tapering toward the other, comprising a truncated curvilinear wedge having arcuate wedge surfaces with a plurality of spaced protuberances to increase frictional contact with an adjacent wheel.

7. A locking wheel chock to prevent the relative rotation of adjacent, aligned tandem wheels carried on spaced axles of a vehicle, comprising in combination:

an elongate compound body having inner and outer body tubes slidable relative to each other, each body tube carrying at its end distal from the other a wheel block to simultaneously contact the circular peripheries of adjacent tandem wheels;

an elongate rack carried by the inner body tube and extending over the outer body tube, said rack defining a plurality of spaced teeth on its surface distal from the inner tube body supporting it;

fastening means including a fastening bracket carried by the outer body tube pivotally carrying a fastening lever defining at one inner end portion a segment of a pinion having teeth to operatively engage the teeth of the rack and a medial fastening catch, said lever being pivotal from a first non-fastening position to a second fastening position to move the body portions together responsive to the pivotal position of the fastening lever.

8. The invention of claim 7 wherein:

the means for fastening the fastening lever further comprising, in its locked position, a fastening dog pivotally carried by the fastening bracket and having a hook to engage the fastening catch defined by the fastening lever, said fastening dog being biased to a fastening position, but movable against its bias to a non-fastening position, and lock means carried by the fastening bracket having a lock bar selectively extendable to maintain the fastening dog in a fastening position.

\* \* \* \* \*